United States Patent
Pelly

(10) Patent No.: US 7,466,822 B2
(45) Date of Patent: Dec. 16, 2008

(54) DATA CODING

(75) Inventor: Jason Charles Pelly, Reading (GB)

(73) Assignee: Sony United Kingdom Limited, Weybridge (GB)

( * ) Notice: Subject to any disclaimer, the term of this patent is extended or adjusted under 35 U.S.C. 154(b) by 620 days.

(21) Appl. No.: 10/497,094

(22) PCT Filed: Dec. 2, 2002

(86) PCT No.: PCT/GB02/05430

§ 371 (c)(1),
(2), (4) Date: May 28, 2004

(87) PCT Pub. No.: WO03/049440

PCT Pub. Date: Jun. 12, 2003

(65) Prior Publication Data

US 2005/0008156 A1    Jan. 13, 2005

(30) Foreign Application Priority Data

Dec. 3, 2001 (GB) .................................. 0128887.7

(51) Int. Cl.
*H04N 7/167* (2006.01)
(52) U.S. Cl. ........................ 380/210; 380/200; 380/216
(58) Field of Classification Search .......... 380/110–140
See application file for complete search history.

(56) References Cited

U.S. PATENT DOCUMENTS

| 3,868,631 | A | | 2/1975 | Morgan et al. |
| 5,121,204 | A | * | 6/1992 | Cila et al. .................... 348/475 |
| 5,515,437 | A | * | 5/1996 | Katta et al. ................ 380/217 |
| 6,700,993 | B1 | * | 3/2004 | Minematsu .................. 382/100 |
| 2003/0142233 | A1 | * | 7/2003 | Eckhardt et al. ............ 348/512 |
| 2004/0037421 | A1 | * | 2/2004 | Truman ...................... 380/200 |
| 2004/0158726 | A1 | * | 8/2004 | Ito et al. ..................... 713/193 |
| 2005/0008156 | A1 | * | 1/2005 | Pelly .......................... 380/239 |
| 2005/0013438 | A1 | * | 1/2005 | Nicolai ....................... 380/268 |
| 2006/0050883 | A1 | * | 3/2006 | Walker et al. ............... 380/239 |
| 2006/0053441 | A1 | * | 3/2006 | Walker ......................... 725/30 |

(Continued)

FOREIGN PATENT DOCUMENTS

EP    0 199 161    10/1986

(Continued)

OTHER PUBLICATIONS

WO00/36838 Jun. 22, 2000 Robertson, Paul, Gordon WIPO.*

(Continued)

*Primary Examiner*—Jingge Wu
*Assistant Examiner*—Sean Motsinger
(74) *Attorney, Agent, or Firm*—Oblon, Spivak, McClelland, Maier & Neustadt, P.C.

(57) ABSTRACT

Data coding apparatus in which input data having a range of possible data values and a smaller sub-range of legal data values is coded by applying a coder mapping which maps input data values in the range of possible input data values and corresponding coded data values within the range of possible data comprises means for detecting, for each coded data value, whether the coded data value lies within the sub-range of legal data values; and means for remapping a coded data value lying outside the sub-range of legal data values to an unused coded data value lying within the sub-range of legal data values.

9 Claims, 5 Drawing Sheets

U.S. PATENT DOCUMENTS

2006/0053471 A1* 3/2006 Walker et al. ............... 725/135
2006/0204007 A1* 9/2006 Doetzkies et al. ........... 380/221

FOREIGN PATENT DOCUMENTS

| EP | 0 277 451 | 8/1988 |
| --- | --- | --- |
| EP | 0 634 869 | 1/1995 |
| GB | 1391441 | 8/1963 |
| JP | 7-222134 | 8/1995 |
| WO | WO 00/36838 | 6/2000 |

OTHER PUBLICATIONS

Kilian et al. "Resistance of Digital Watermarks to Collusive Attacks" Jul. 27, 1998.

Menezes et al. extract "Handbook of Applied Cryptography", Oct. 1996, pp. 228-238.

* cited by examiner

DATA CODING

This invention relates to data coding and decoding.

Data coding and decoding systems are required in many different applications. An example which will be described below is that of so-called digital cinema, but the problems to be described, and the techniques provided by the invention, are not restricted to this technical field and in fact are applicable widely.

Digital cinema is a term used to describe cinema systems using electronic video signals rather than conventional light-sensitive film. It is seen to be an advantageous development in the cinema industry for many reasons—for example, the "software", i.e. the cinema production to be viewed, may be stored and distributed more robustly or easily, and may be made less susceptible to unauthorised copying. In order to provide a large-screen image quality comparable to that obtained with light-sensitive film, high-definition video storage and projection systems will probably be used.

Figure 1:
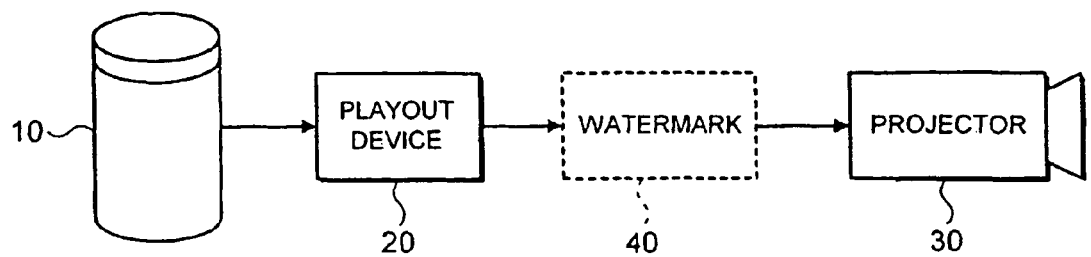

FIG. 1 of the accompanying drawings schematically illustrates a digital cinema projection system comprising a data storage medium 10 (e.g. a magnetic disk, magneto-optical disk, tape, solid-state memory etc) for storing video, audio and other data, probably in compressed form, a playout device 20 which reads video, audio and other data from the storage medium 10, decompresses it and formats it ready for projection, and a projector 30 which converts the decompressed and formatted data into an optical output for projection onto a screen (not shown).

It has been proposed that data is carried between the playout device 20 and the projector 30 using a data communications standard known as "HD-SDI", or high definition serial digital interface. However, other data communications standards may of course be used.

Optionally, further equipment such as so-called "watermarking" apparatus may be inserted between the playout device and the projector, to add a watermark to the video and/or audio data to help detect unauthorised copying, for example "camcorder piracy" where a camcorder is smuggled into a cinema and used to record the images displayed on the screen. An example of a suitable watermarking algorithm is described in U.S. Pat. No. 5,664,018 and "Resistance of Digital Watermarks to Collusion Attacks", J Kilian et al, MIT, 27 Jul. 1998.

To inhibit unauthorised copying, the data stored on the storage medium 10 is likely to be encrypted, with the playout device 20 carrying out a corresponding decryption process. This then means that uncompressed and unencrypted video and audio data is being transferred from the playout device 20 to the projector 30. In turn, this would introduce a security risk, potentially allowing unauthorised copying of the material.

One possible solution to this problem would be to include the functionality of the playout device, and other optional devices such as the watermarking apparatus, in the projector 30 in a secure, tamper-proof manner. However, this would make the projector very expensive and would also inhibit upgrading of other parts of the system.

So, it has been proposed that the data transferred from the playout device to the projector 30 should be encrypted using a simple but secure encryption system. An example of such a system is the Output Feedback (OFB) technique described in the reference "Handbook of Applies Cryptography", A J Menezes et al, CRC Press, 1997. The OFB system operates on a sample-by-sample basis and provides a mapping between input sample values and output sample values. The mapping itself can change pseudorandomly from sample to sample.

(Of course, the skilled man will understand that the term "change", when used in respect of a pseudorandom arrangement like this, does not necessarily imply that a change has to take place at every possible occasion. It is possible that the same mapping might be maintained from sample to sample by virtue of the statistical properties of the pseudorandom system. The term "change" is taken to encompass this possibility).

Figure 2:
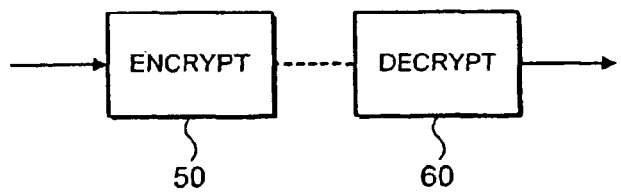

An example of such a system is shown schematically in FIG. 2 of the accompanying drawings. Quite simply, an encryption device 50 maps each input data value it receives to an encrypted data value which is then passed to other data handling apparatus including a decrypting device 60. The decrypting device 60 carries out the inverse mapping to recover the input data value.

Figure 3:
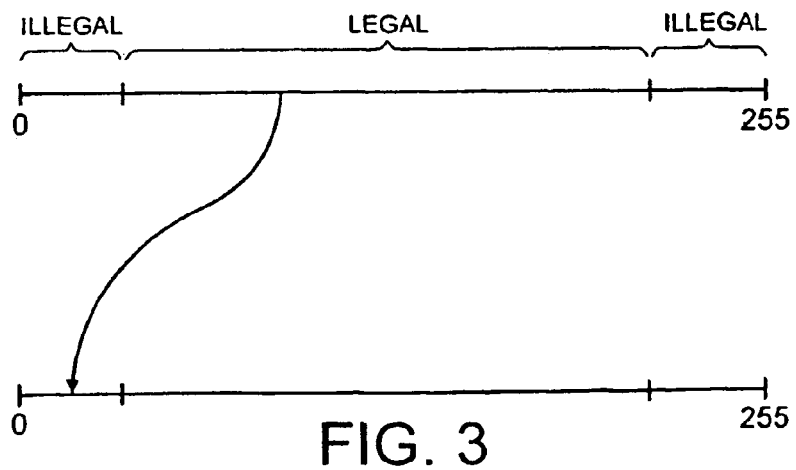

A complication then arises. Very often, video or audio data in a particular transmissions format has a range of "legal" data values and a complimentary range of "illegal" data values. For example, in 8-bit SDI active video the luminance data values decimal 0-15 and decimal 236-255 never occur. FIG. 3 of the accompanying drawings schematically illustrates this situation, showing a range of possible data values (the horizontal lines) with legal and illegal sub-ranges. However, a sample-by-sample encryption algorithm could encrypt legal data values to generate illegal data values. For example, the legal data value decimal 123 might be encrypted by the OFB system into an encrypted value of decimal 9, which is illegal. There could be problems with intervening data handling apparatus if the SDI data stream contains illegal data values.

Therefore, there exists a problem in using an encryption/decryption system on video or other data having a "legal" sub-range of data values within the entire available range, which is that encrypted data values may be generated which lie outside of the legal sub-range of values.

The following prior art references are noted: GB-A-1 391 441; EP-A-0 634 869; EP-A-0 277 451; EP-A-0 199 161; U.S. Pat. No. 3,868,631; and JP-070222134.

This invention provides data coding apparatus in which input data having a range of possible data values and a smaller sub-range of legal data values is coded by applying a coder mapping which maps input data values in the range of possible input data values and corresponding coded data values within the range of possible data values, the apparatus comprising:

means for detecting, for each coded data value, whether the coded data value lies within the sub-range of legal data values; and means for remapping a coded data value lying outside the sub-range of legal data values to an unused coded data value lying within the sub-range of legal data values, the remapping means comprising, in respect of a current coder mapping:

means for detecting a position of an illegal coded data value in a predetermined ordering of illegal coded data values;

means for mapping the detected position to a required position in a predetermined ordering of unused legal coded data values; and means for remapping the illegal coded data value to the unused legal coded data value at the required position in the predetermined ordering of unused legal coded data values.

The invention addresses the above problem by the elegantly simple step of remapping an illegal coded data value to an unused coded data value lying within the sub-range of legal data values.

In particular, the invention involves the recognition that, in a mapped coding system of this type, for every input data value which maps to an illegal coded value, there will be a coded value which is the mapping of an illegal input data value. Since illegal input data values do not occur, the coded value representing the mapping of an illegal input data value will never occur in the mapped data. Such a coded value is therefore termed here an "unused" coded value.

So, there are as many unused coded data values within the legal sub-range as there are input data values mapping to illegal coded values. It is the inventive recognition of this feature of such coders which then allows the remapping process to take place. An illegal coded data value is remapped to an unused coded data value.

Preferably, for increased data security, the coder mapping changes between adjacent input data values. Here the skilled man will understand the term "change" as described above.

Preferably the coder mapping is symmetrical as between input data values and coded data values. In other words, if an input data value x maps to a coded value y, then an input value y will map to a coded value x. However, asymmetrical mappings may of course be used.

The remapping means comprises, in respect of a current coder mapping: means for detecting a position of an illegal coded data value in a predetermined ordering of illegal coded data values; means for mapping the detected position to a required position in a predetermined ordering of unused legal coded data values; and means for remapping the illegal coded data value to the unused legal coded data value at the required position in the predetermined ordering of unused legal coded data values. This provides a remapping algorithm which, without the knowledge of the coder mapping, is unpredictable to the observer.

In respect of a system using a symmetrical mapping, an elegantly simple approach is for the means for remapping to be operable to remap a coded data value lying outside the sub-range of legal data values to the corresponding input data value.

The invention is particularly suitable for use where the input data values represent audio and/or video data. The invention is particularly suitable for use in a digital cinema projection system or a video projector.

Various other aspects and features of the invention are defined in the appended claims.

Figure 4:
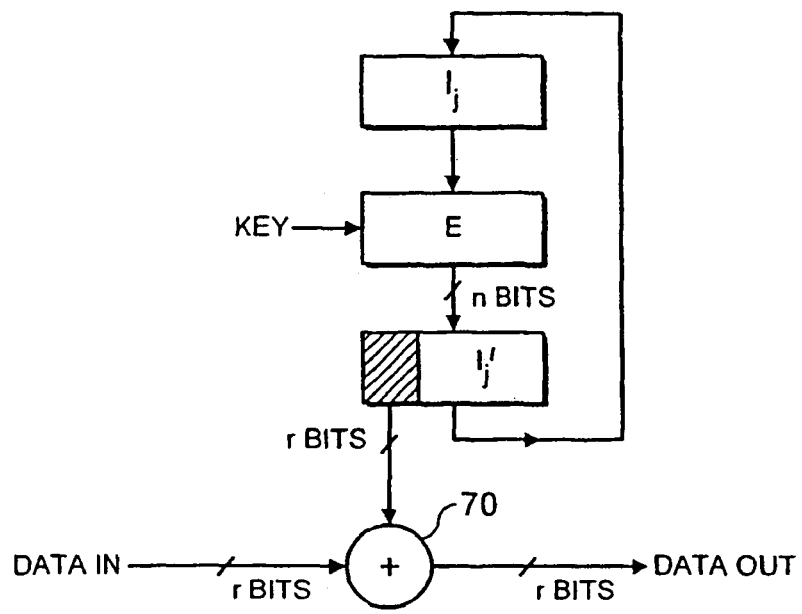
Figure 5:
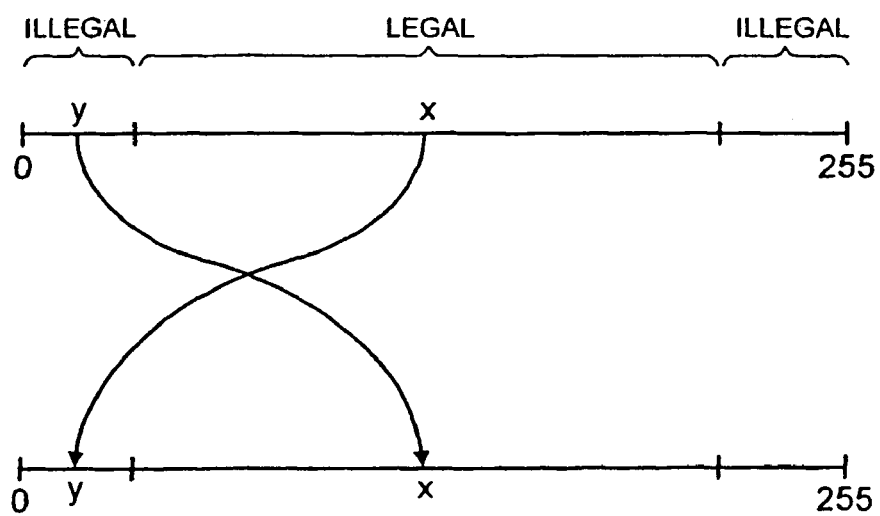
Figure 6:
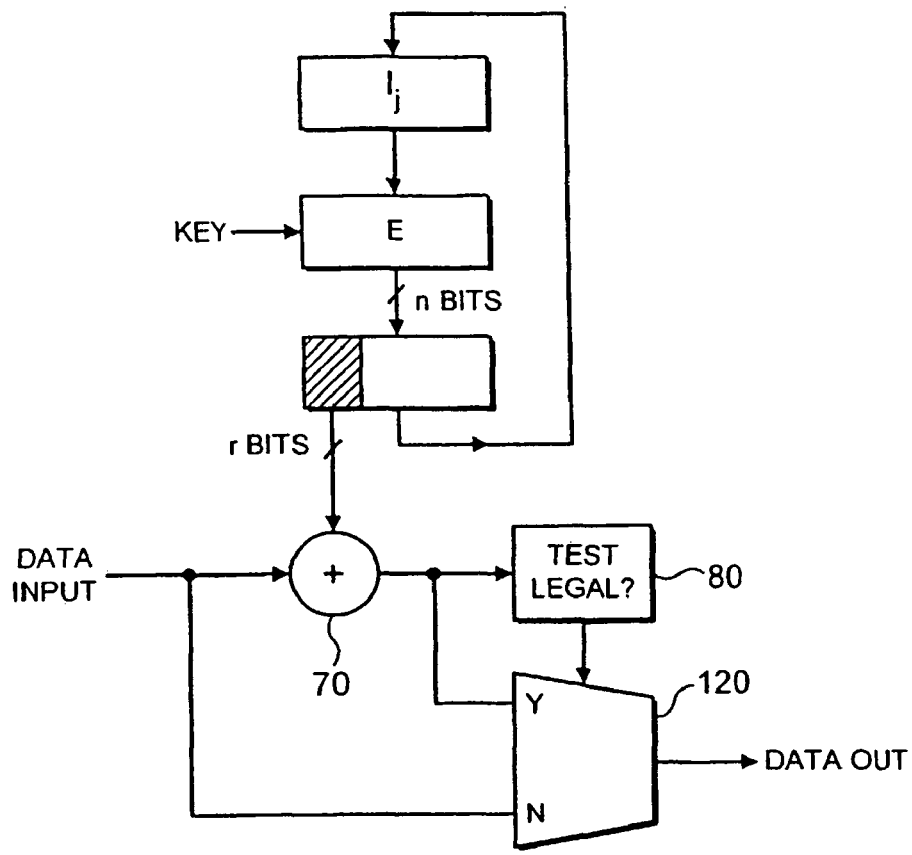
Figure 7:
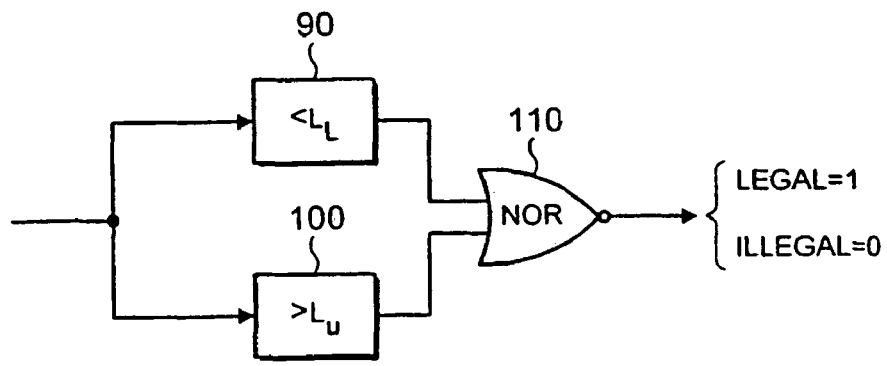
Figure 8:
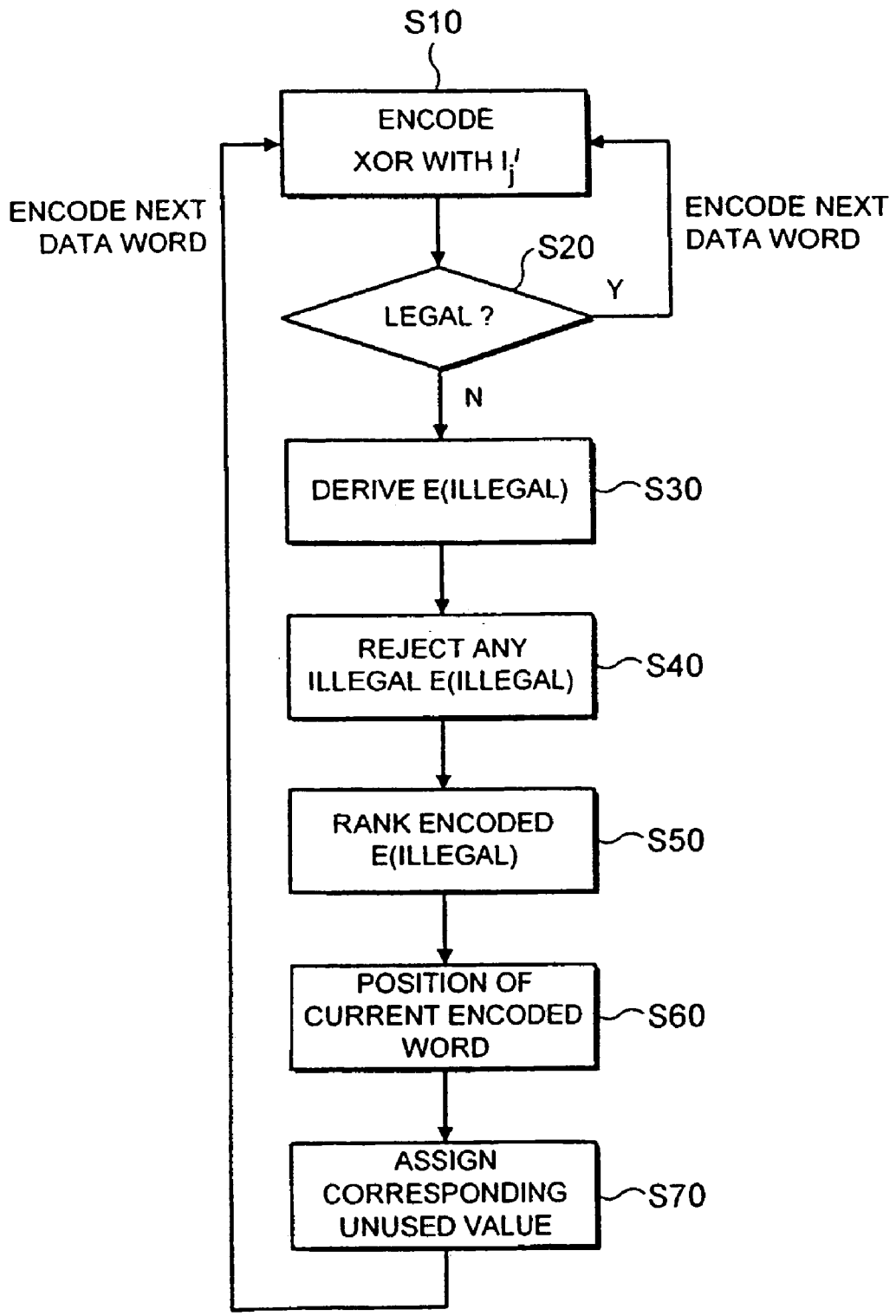
Figure 9:
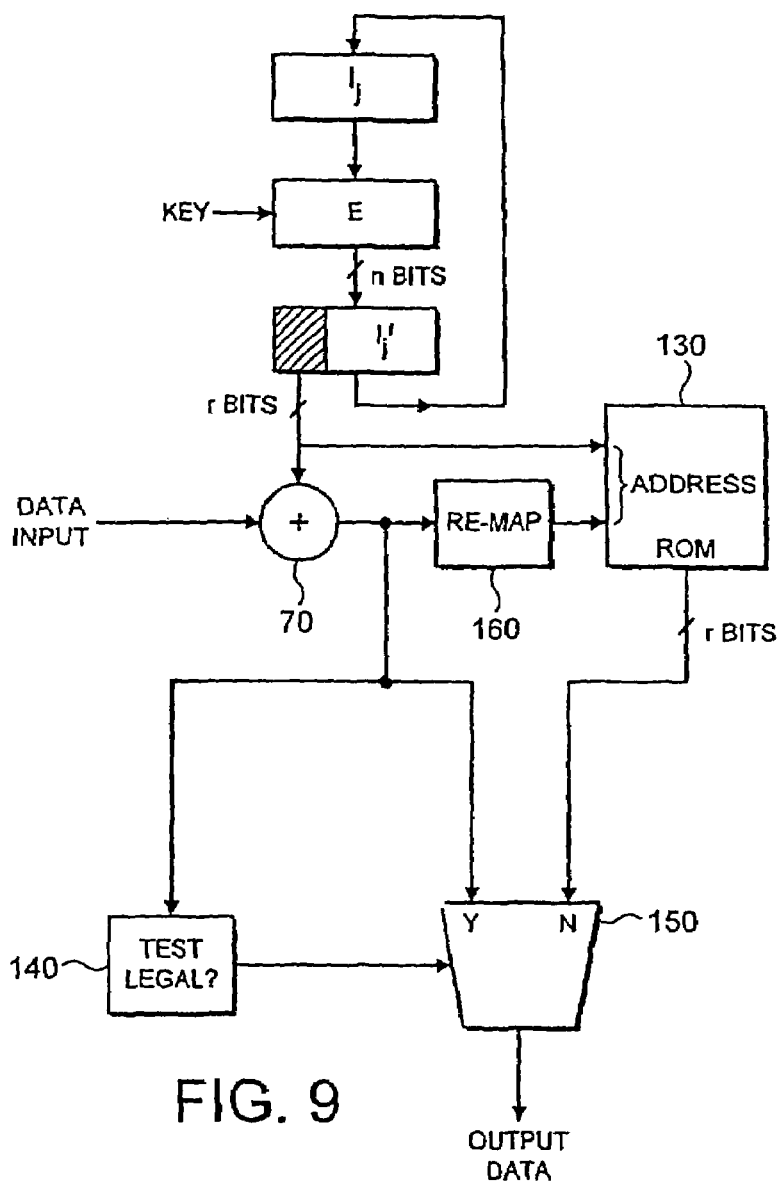
Figure 10:
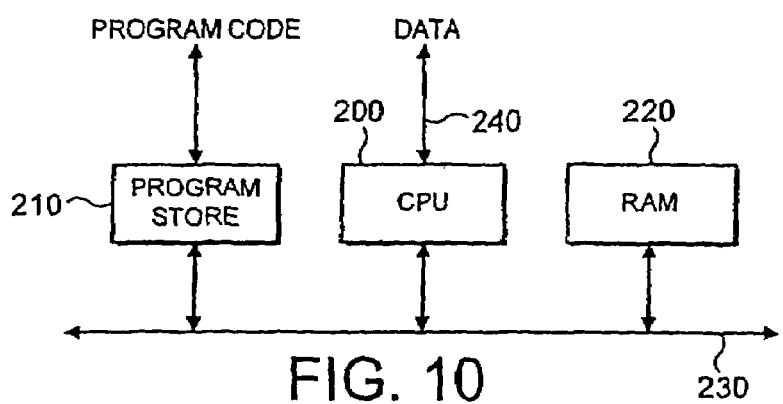

Embodiments of the invention will now be described, by way of example only, with reference to the accompanying drawings, in which:

FIG. 1 schematically illustrates a digital cinema system;

FIG. 2 schematically illustrates an encryption/decryption system;

FIG. 3 schematically illustrates a mapping forming part of an encryption process;

FIG. 4 schematically illustrates an OFB encoder/decoder;

FIG. 5 schematically illustrates a symmetrical mapping process;

FIG. 6 schematically illustrates an encoder/decoder;

FIG. 7 schematically illustrates a legality tester;

FIG. 8 is a schematic flowchart illustrating an encoding/decoding process according to an embodiment of the invention;

FIG. 9 schematically illustrates an encoding/decoding apparatus according to the embodiment of the invention; and FIG. 10 schematically illustrates software-controlled programmable logic for implementing the embodiment of the invention.

FIG. 4 schematically illustrates an output feedback ("OFB") encoder/decoder in which an index value $I_j$, after being initially seeded to a starting value, is subject to encryption algorithm E (responsive to a key value) to generate an encrypted index $I'_j$. The encrypted index $I'_j$ is then fed back to become the next value of the index, $I_{j+1}$.

The index values $I_j$ are, in this example, 128 bit words. In general, they are referred to in FIG. 4 as being n bit words. Each data word to be encrypted has r bits, where in this example r is 8. The data words are encoded by an exclusive-OR combination 70 between each data word and r bits of the encrypted index value $I'_j$, for example, the least significant r bits of $I'_j$ could be used. This generates an output data word also having r bits.

Suitable encryption algorithms for the function E are described in the Menezes et al reference. As discussed above, it will be appreciated that $I_{j+1}$ need not necessarily differ from $I_j$, but for a strong encryption process it is preferred that they differ at least most of the time.

A property of the exclusive-OR combination is that it gives a symmetrical encoding process. This is schematically illustrated in FIG. 5. If an input data word x is encoded by the exclusive-OR combination to give an output data word y, then an input data word y would be encoded to give an output data word x. This means that as long as the encoder and decoder are "seeded" with the same starting value of the index $I_j$ and then run synchronously, exactly the same apparatus of FIG. 4 may be used as an encoder or a decoder.

Referring to FIG. 5 again, it will be seen that the value x is in the legal sub-range of values and the value y is in the illegal sub-range of possible values. This demonstrates how this encoding process is used in a first arrangement shown schematically in FIG. 6 (included for technological background but not an embodiment of the claimed invention). In FIG. 6, if an input data word, which by definition will be in the legal sub-range of values, is encoded to give an encoded data word in the illegal sub-range of values, then the original value of the input data word is substituted for the encoded data word. So, using the notation of FIG. 5, if the input data value x was encoded to give an illegal encoded value y, the original value x would be used as the encoded data word.

This is possible because the symmetry of FIG. 5 guarantees that the encoded value x will be unused, that is to say, it can be guaranteed that the encoded value x would only normally be generated by encoding an illegal input value y, where such an input value would never occur as an input data word. So, we can be sure that encoding the input data word x as an output data word x does not lead to any ambiguity at decoding.

So, in FIG. 6, the output of the exclusive-OR gate 70 is supplied to a legality tester 80. The legality tester 80 is shown schematically in FIG. 7 and comprises two comparators 90, 100, where the comparator 90 detects whether the output of the exclusive-OR gate 70 lies below a lower legal limit $L_L$ and the comparator 100 detects whether the output of the exclusive-OR gate is above an upper legal limit $L_U$. The outputs of the two comparators are supplied to a NOR gate 110 which generates an output flag indicating whether the current value is legal or not.

Returning to FIG. 6, both the input data word and the output of the exclusive-OR gate 70 are supplied to a multiplexer 120 which is controlled by the legality tester 80. If the output of the exclusive-OR gate 70 is legal, then it is passed as the output data word. If it is illegal, then the multiplexer 120 passes the input data word.

The apparatus of FIG. 6 may be used as either an encoder or a decoder. At the decoding site, consider the case where an encoded data word x needs to be decoded. The output of the exclusive-OR gate 70 would be an illegal word y, and so the legality tester 80 and the multiplexer 120 will pass the original word x as the output data word.

FIG. 8 is a schematic flowchart illustrating an encoding/decoding process according to an embodiment of the invention. In order to describe FIG. 8, each flowchart step will be described in turn, and then a worked example will be given.

So, with regard to the flowchart steps, at a step S10 a current input data word is encoded by an exclusive-OR with an index value of $I'_j$. This is the same as the process shown in FIG. 4 and the encoded data word appears at the output of the exclusive-OR gate 70.

At a step S20, the encoded data word is tested for legality, for example by a legality tester as shown in FIG. 7. If it is legal, control passes back to the step S10 to encode the next data word. The legal encoded data word is output.

If the current encoded data word is not legal then control passes to a step S30. Here, each of the possible values in the illegal sub-range(s) of the possible range of data values is encoded. At a step S40, any of these encoding results which are still illegal are rejected. This leaves a mapping between legal and illegal values under the current encryption operation by an exclusive-OR with the current $I'_j$. Because of the symmetry of the encoding process, this mapping shows not only which illegal values would be encoded as legal values, but also which legal values are encoded as illegal values. In other words, it also shows the unused legal values in the encoded data which cannot occur normally because they would be the encoding result of an illegal input data value (which in turn does not occur in the input data stream).

At a step S50, these unused values are ranked in numerical order, bearing in mind that this order may not correspond to the numerical order of the illegal values from which they were derived.

At a step S60 the position of the encoded data word in the rank of illegal encoded data words resulting from legal input data words is established. The worked example below will provide additional explanation of this step.

Finally, at a step S70 the unused data value at the same position within the group of unused data values as the position established in step S60 is assigned as the output data word for that input data word. Control then returns to the step S10 to encode the next data word.

Worked Example

For simplicity of this explanation, consider a situation where r is 4, i.e. there are 16 possible data values, decimal 0 to 15. Assume that the values 0 to 5 are illegal.

Assume that the encoder mapping (i.e. the mapping provided by the exclusive-OR gate 70) is as follows:

| Input  | 0 | 1 | 2  | 3 | 4 | 5 | 6 | 7 | 8  | 9 | 10 | 11 | 12 | 13 | 14 | 15 |
|--------|---|---|----|---|---|---|---|---|----|---|----|----|----|----|----|----|
| Output | 7 | 3 | 10 | 1 | 6 | 9 | 4 | 0 | 14 | 5 | 2  | 15 | 13 | 12 | 8  | 11 |

The current input data word is 10, which is initially mapped by the exclusive-OR gate to an illegal value of 2. So, we know that the mapping of 2 is to 10. At the step S30, the remaining mappings of other illegal values 0, 1, 3, 4, 5 are obtained as follows:

| Input  | 0 | 1 | 2  | 3 | 4 | 5 |
|--------|---|---|----|---|---|---|
| Output | 7 | 3 | 10 | 1 | 6 | 9 |

Of these, 1 and 3 both map to illegal values and so are rejected at step S40, leaving these remaining mappings:

| Input  | 0 | 2  | 4 | 5 |
|--------|---|----|---|---|
| Output | 7 | 10 | 6 | 9 |

This indicates that the unused values in the output data words, ranked in numerical order at step S50, are 6, 7, 9 and 10.

At step S60, the position of the current encoded word in the results output by step S40 is established. This means that the position of the encoded version of 10, that is to say, 2, is established in the ordered group of 0, 2, 4, 5. In fact the value 2 is in the second position in this group.

So, at step S70 the second unused value in the ranked list of 6, 7, 9 and 10 is assigned as the encoded data word for an input data word of 10. This means that the encoded data word for 10 is 7.

This is just one example of a more general idea that some sort of reproducible order or the like is assigned to the unused values in order that the correct re-mapping process can be established at both encoder and decoder from the encoder mapping alone. Unlike the arrangement of FIG. 6, the embodiment does not need to rely on the "symmetry" feature of the encoding process described above, as the unused values could be established, for example, by an exhaustive test of all possible input data value encryptions (easy to do in parallel hardware or in preparing the ROM). It does make use of an important feature of a mapping encoder which is that the number of unused values will be the same as the number of legal input data values mapping to illegal encoded values, but the unused values do not have to be the same as the legal input data values.

FIG. 9 schematically illustrates an encoding/decoding apparatus according to the embodiment of the invention. Here, it is noted that calculating all of the encoded values for illegal inputs, ranking them, and assigning positions within that ranking is potentially quite wasteful of available hardware, when the calculations could equally be performed in advance. So, to reduce the amount of real-time processing which is required, a read only memory (ROM) 130 is used in FIG. 9. The way in which the ROM is addressed and used will now be described.

In FIG. 9, there is provided a legality tester 140 which tests the legality of an output data word from the exclusive-OR gate 70, a multiplexer 150 controlled by the legality tester and a re-mapping device 160.

If the legality tester detects that the output of the exclusive-OR gate 70 is legal, then the multiplexer 150 passes the output of the exclusive-OR gate 70 as an output data word. If the output of the exclusive-OR gate 70 is not legal, the multiplexer 150 passes a substitute data word which will now be described.

The ROM 130 is addressed by a composite address word formed of the r bits of $I'_j$ in the encoder and a re-mapped version of the output of the exclusive-OR gate 70. The re-mapping by the device 160 maps all of the illegal sub-ranges into consecutive sub-ranges, so reducing the number of bits needed to represent an illegal data value. However, since the difference is small, the re-mapping 160 could be dispensed with. In the present example, re-mapping the illegal ranges allows them to be represented by 6 bits, whereas not using a re-mapping process would require 8 bits to represent the illegal sub-ranges. So, if re-mapping is used, a 14 bit address is supplied to the ROM 130 whereas without re-Mapping a 16 bit address is supplied to the ROM 130. Both are well within the capabilities of current technology ROMs.

The output of the ROM 130 is an r bit data word representing the result of the process illustrated by the flowchart of FIG. 8. This is passed to the multiplexer 150 and, assuming the current encoded data word was illegal, the output of the ROM is passed as output data.

Finally, FIG. 10 schematically illustrates software-controlled programmable logic for implementing the embodiment of the invention. FIG. 10 shows a central processing unit (CPU) 200, a program store 210 such as a disc, read only memory, random access memory or the like, which may or may not receive program code from an external transmission medium such as a network or the internet, and a random access memory (RAM) 220 for temporary storage of working data during operation of the program. These three are linked by a bus 230 and a data input/output connection 240 is provided, for example to the CPU.

The invention claimed is:

1. A data coding apparatus in which input data having a range of possible data values and a smaller sub-range of legal data values is coded by applying a first coder mapping which maps input data values in the range of possible input data values and corresponding coded data values within the range of possible data values, the apparatus comprising:
    means for detecting, for each coded data value, whether the coded data value lies within the sub-range of legal data values; and
    means for remapping a coded data value lying outside the sub-range of legal data values according to a second coder mapping different from the first coder mapping to an unused coded data value lying within the sub-range of legal data values, the remapping means, in respect of the first coder mapping, being configured to (1) detect a position of an illegal coded data value in a predetermined ordering of illegal coded data values; (2) map the detected position to a required position in a predetermined ordering of unused legal coded data values; and (3) remap the illegal coded data value to the unused legal coded data value at the required position in the predetermined ordering of unused legal coded data values in accordance with the second coder mapping.

2. The apparatus according to claim 1, wherein the first coder mapping changes between adjacent input data values.

3. The apparatus according to claim 1, wherein the first coder mapping is symmetrical as between input data values and coded data values.

4. The apparatus according to claim 1, wherein the input data values represent audio and/or video data.

5. A data coding apparatus in which input data having a range of possible data values and a smaller sub-range of legal data values is coded by applying a first coder mapping which maps input data values in said range of possible input data values and corresponding coded data values within said range of possible data values, said apparatus comprising:
    a detector configured to detect, for each coded data value, whether a coded data value lies within said sub-range of legal data values; and
    remapping logic configured to remap a coded data value lying outside said sub-range of legal data values according to a second coder mapping different from the first coder mapping to an unused coded data value lying within said sub-range of legal data values, said remapping logic, in respect the first coder mapping, being configured to (a) detect a position of an illegal coded data value in a predetermined ordering of illegal coded data values; (b) map said detected position to a required position in a predetermined ordering of unused legal coded data values; and (c) remap said illegal coded data value to the unused legal coded data value at the required position in said predetermined ordering of unused legal coded data values in accordance with the second coder mapping.

6. A digital cinema projection system, comprising:
    an audio/video playout apparatus;
    a video projector; and
    a data transmission link configured to transfer data from the playout apparatus to the video projector, the data transmission link comprising the data coding apparatus according to claim 1.

7. A video projector comprising the data coding apparatus according claim 1.

8. A data coding method in which input data having a range of possible data values and a smaller sub-range of legal data values is coded by applying a first coder mapping which maps input data values in the range of possible input data values and corresponding coded data values within the range of possible data values, the method comprising the steps of:
    detecting, for each coded data value, whether the coded data value lies within the sub-range of legal data values; and
    remapping a coded data value lying outside the sub-range of legal data values according to a second coder mapping different from the first coder mapping to an unused coded data value lying within the sub-range of legal data values, the remapping step in respect of the first coder mapping, including the steps of
    detecting a position of an illegal coded data value in a predetermined ordering of illegal coded data values;
    mapping the detected position to a required position in a predetermined ordering of unused legal coded data values; and
    remapping the illegal coded data value to the unused legal coded data value at the required position in the predetermined ordering of unused legal coded data values in accordance with the second coder mapping.

9. A computer readable storage medium storing a computer program including instructions that cause a computer, when executing the instructions, to carry out the method of claim 8.

* * * * *